(12) United States Patent
Reif

(10) Patent No.: US 11,189,107 B2
(45) Date of Patent: Nov. 30, 2021

(54) 3D DEVICE SIMULATOR VISUALIZER PLATFORM AS A SERVICE

(71) Applicant: HITACHI AMERICA, LTD., Santa Clara, CA (US)

(72) Inventor: Eldor Reif, San Ramon, CA (US)

(73) Assignee: HITACHI AMERICA, LTD., Santa Clara, CA (US)

(\*) Notice: Subject to any disclaimer, the term of this patent is extended or adjusted under 35 U.S.C. 154(b) by 0 days.

(21) Appl. No.: 16/979,828

(22) PCT Filed: Mar. 27, 2018

(86) PCT No.: PCT/US2018/024648
§ 371 (c)(1),
(2) Date: Sep. 10, 2020

(87) PCT Pub. No.: WO2019/190485
PCT Pub. Date: Oct. 3, 2019

(65) Prior Publication Data
US 2021/0065461 A1    Mar. 4, 2021

(51) Int. Cl.
*G06T 19/20* (2011.01)
*G06T 15/20* (2011.01)
*G06T 17/00* (2006.01)

(52) U.S. Cl.
CPC ............ *G06T 19/20* (2013.01); *G06T 15/20* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 5,099,846 A | * | 3/1992 | Hardy ................ A61N 5/1031 378/4 |
| 5,729,471 A | | 3/1998 | Jain et al. |
| 7,085,409 B2 | | 8/2006 | Sawhney et al. |
| 7,259,778 B2 | | 8/2007 | Arpa et al. |
| 8,248,417 B1 | | 8/2012 | Clifton |
| 8,442,306 B2 | | 5/2013 | Garaas et al. |
| 8,482,609 B1 | | 7/2013 | Mishra et al. |
| 8,830,230 B2 | | 9/2014 | Bai et al. |
| 8,934,017 B2 | | 1/2015 | Chen et al. |
| 9,019,273 B2 | | 4/2015 | Bai et al. |
| 9,369,679 B2 | | 6/2016 | Arfvidsson et al. |
| 9,438,865 B2 | | 9/2016 | Renkis |
| 2005/0002662 A1 | | 1/2005 | Arpa et al. |

(Continued)

OTHER PUBLICATIONS

International Search Report and Written Opinion for related International Application No. PCT/US2018/024648, dated Jun. 8, 2018 (17 pages).

(Continued)

*Primary Examiner* — Robert J Craddock
(74) *Attorney, Agent, or Firm* — Procopio, Cory, Hargreaves & Savitch LLP

(57) ABSTRACT

Example implementations described herein are directed to simulation of devices to be installed in a facility through a high resolution 3D model. A high resolution capture device is utilized to capture 3D images of a facility to generate a 3D model from which devices can be located in freespace within the 3D model and simulated to provide simulated perspective views of facility from the perspective of the device.

20 Claims, 10 Drawing Sheets

(56) References Cited

U.S. PATENT DOCUMENTS

2010/0284607 A1   11/2010   Van Den Hengel et al.
2015/0334374 A1   11/2015   Yun et al.

OTHER PUBLICATIONS

State, A. et al. "An Interactive Camera Placement and Visibility Simulator for Image-Based VR Applications" Society of Photo-Optical Instrumentation Engineers, Jan. 30, 2006 (14 pages).
Yang, G. et al. "Estimating the Location of a Camera with Respect to a 3D Model" 3-D Digital Imaging and Modeling, 2007; Montreal, QC, Canada (10 pages).

* cited by examiner

| Device | Resolution | FOV | Effects | Effects |
|---|---|---|---|---|
| CAMERA1 | RES1 | FOV1 | Eff1 | OTH1 |
| CAMERA2 | RES2 | FOV2 | Eff2 | OTH2 |
| SENSOR1 | RES3 | FOV3 | Eff3 | OTH3 |
| SENSOR2 | RES4 | FOV4 | Eff4 | OTH4 |
| SPRINKLER1 | N/A | N/A | Eff5 | OTH5 |
| ••• | ••• | ••• | | ••• |

FIG. 7

3D DEVICE SIMULATOR VISUALIZER PLATFORM AS A SERVICE

CROSS-REFERENCE TO RELATED APPLICATIONS

This application is a U.S. National Stage entry of PCT Application No: PCT/US2018/024648 filed Mar. 27, 2018, the contents of which are incorporated herein by reference.

BACKGROUND

Field

The present disclosure is directed to device simulation, and more specifically, to a three dimensional (3D) device simulator visualizer platform as a service (PaaS).

Related Art

Managers of facilities such as office spaces, buildings, outdoor structures, and so on, often need to determine what devices to purchase and install for their facility to produce certain functionalities among a myriad of possible devices based on their budget and facility layout. For example, the installation of surveillance systems can involve reviewing and testing a wide variety of cameras, sensors and other devices at a wide variety of possible locations in the facility to determine if such devices function effectively within their facility for their intended purposes. Installation of devices such as lighting, sound speakers, sprinklers and others for a facility can involve purchasing and testing many different devices at many different locations within the facility to determine their effectiveness. In particular, equipment with particular area ranges of functionality such as surveillance cameras, sensors, lighting, and so on, are physically tested and monitored to determine if they cover the desired areas within the facility. For example, it may not be known if a particular type of surveillance camera would be sufficient in capturing particular areas of or objects in the facility, or operate at a sufficient resolution or effective range for the desired purposes until the device is physically tested.

In the related art, there exist Computer Aided Design (CAD) based software solutions that can allow a facility manager to draw or illustrate the layout of the facility and/or generate a three dimensional (3D) model of the facility based on the floorplan drawn in the software. Such software solutions can also allow the facility manager to place polygon images representing furniture, doors, and other objects within the 3D model to provide a computer graphic simulation of the facility. Perspective views can be taken within the 3D model to provide a rough estimate to the facility manager as to how a device would function when placed within the 3D model, before the facility manager purchases the device for actual testing once the facility is constructed. However, such implementations are oftentimes unrealistic enough that the difference between the actual implementation and the designed implementation can differ widely.

SUMMARY

In the related art implementations, once the facility is constructed and all the corresponding objects of the facility are set up, the facility managers have to physically install the devices to obtain the actual views or telemetry from the device for a given facility, connect the devices to a network, then run the devices to test how the devices would function in the facility (e.g., what camera views or telemetry would actually be generated, the range of the line of sight of the devices, etc.) If the device is unsatisfactory for its purposes or the location is improper in view of the facility set up, the facility managers would have to remove the device and reinstall a new device or the device at a different location. Such modifications are costly, as new devices would have to be purchased and/or repositioned and reconnected to the network and retested to determine the actual functionality of the device in the facility.

Further, related art software solutions for providing models of a facility are insufficient in determining how the actual devices would perform once the facility is set up as they are not sufficiently realistic. As such related art solutions are based on CAD rendered floorplans of how the facility would be arranged, simulating devices on such platforms only provides a guess regarding how actual devices would function once the facility is set up, and is oftentimes inaccurate compared to the actual implementation. Further, on such related art software solutions, it can be difficult to understand where the devices are being positioned within the CAD rendered floorplan. For example, if the CAD rendered floorplan is in 3D, projecting the 3D view onto a physical paper report or an exported document file provides a confusing view as to the location of such devices with respect to the actual facility setup. Such CAD rendered 3D models of the floorplan are oftentimes unrealistic, and can lead to the facility manager purchasing and testing more devices than necessary due to the differences between the computer illustrated 3D model and the real implementation of the device.

Example implementations described herein are directed to addressing the aforementioned problems by utilizing 3D models generated from images taken by capture devices having a resolution that encompasses all of the potential resolutions and ranges of the devices to be installed in the facility, and that are configured to capture imagery in 3D. Through testing, an unexpected effect was found in executing the example implementations described herein in that the model and simulation of devices as executed according to the example implementations provided a realistic enough simulation such that facility managers may no longer need to physically purchase and install/test devices within their facility to determine how the device would actually function. The simulations resulting from the example implementation were realistic enough that such costs could thereby be avoided.

Aspects of the present disclosure can include a method, which involve for a three dimensional (3D) model of a facility generated from images of the facility provided by an apparatus configured to generate 3D images of the facility, receiving a location in 3D space on the 3D model for placement of a device; determining a restricted perspective view of the 3D model from the location in 3D space from applying parameters of the device on a perspective view of the 3D model from the location in 3D space, wherein the parameters of the device are indicative of capabilities of the device; and generating for display, the restricted perspective view of the 3D model from the location in 3D space to simulate the device.

Aspects of the present disclosure can include a non-transitory computer readable medium, storing instructions for executing a process, the instructions involving for a three dimensional (3D) model of a facility generated from images of the facility provided by an apparatus configured to generate 3D images of the facility, receiving a location in 3D space on the 3D model for placement of a device; determining a restricted perspective view of the 3D model from the location in 3D space from applying parameters of the device on a perspective view of the 3D model from the location in 3D space, wherein the parameters of the device are indicative of capabilities of the device; and generating for display, the restricted perspective view of the 3D model from the location in 3D space to simulate the device.

Aspects of the present disclosure can include a system involving for a three dimensional (3D) model of a facility generated from images of the facility provided by an apparatus configured to generate 3D images of the facility, means for receiving a location in 3D space on the 3D model for placement of a device; means for determining a restricted perspective view of the 3D model from the location in 3D space from applying parameters of the device on a perspective view of the 3D model from the location in 3D space, wherein the parameters of the device are indicative of capabilities of the device; and means generating for display, the restricted perspective view of the 3D model from the location in 3D space to simulate the device.

Aspects of the present disclosure can further include a system, which can involve a memory, configured to manage a three dimensional (3D) model of a facility generated from images taken by a capture device configured to capture 3D images of the facility; and a processor, configured to receive a location in 3D space on the 3D model for placement of a device; determine a restricted perspective view of the 3D model from the location in 3D space from applying parameters of the device on a perspective view of the 3D model from the location in 3D space, wherein the parameters of the device are indicative of capabilities of the device; and generate for display, the restricted perspective view of the 3D model from the location in 3D space to simulate the device.

BRIEF DESCRIPTION OF DRAWINGS

FIG. 7 illustrates example management information for selectable devices in accordance with an example implementation.

DETAILED DESCRIPTION

Figure 1:
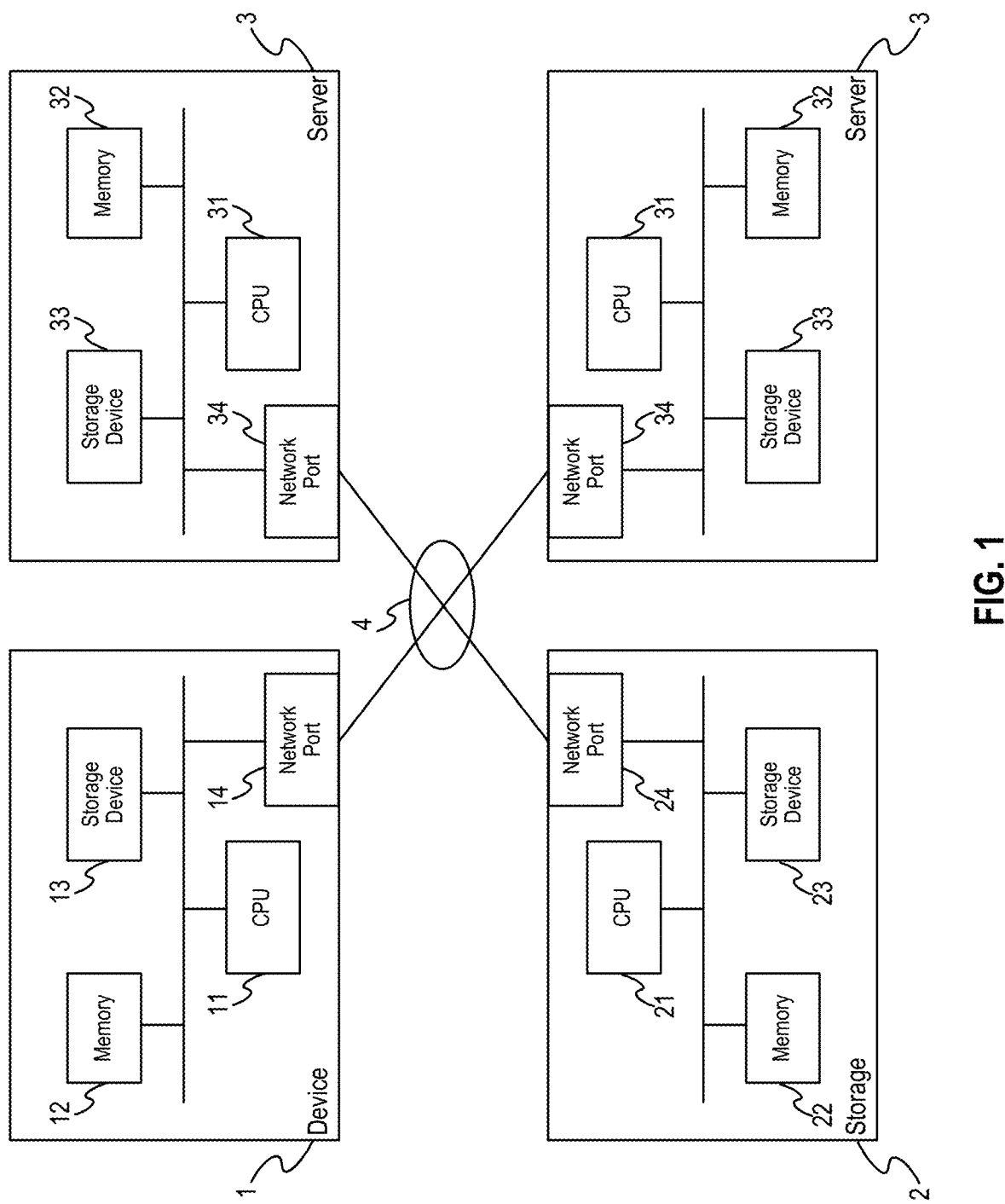
FIG. 1 illustrates an example physical configuration for the cloud system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

To address the problems of the related art, example implementations described herein utilize a 3D model of a facility generated from images captured by a capture device configured to capture 3D images of the facility (e.g., a 3D camera, a 360 degree camera, fish eye cameras, 3D mobile depth sensing devices, etc.). With the advent of high resolution 3D capture devices, it is possible to render a highly detailed model of a facility at a resolution that exceeds that of typical surveillance devices and other sensors and devices that are typically installed in a facility. As facilities can be very different in nature depending on the desired implementation (e.g., a building floor, an auditorium, an outdoor deck or gazebo to be surveilled, a house, an office space, etc.), the example implementations described herein are flexible enough to be extended to any type of facility in accordance with the desired implementation.

In example implementations, when the 3D model of a facility is rendered with such high resolution images, one unexpected result that occurs is that all of the typical surveillance devices and other sensors/devices can be realistically simulated such that the user can be shown how such a device would operate at a given location in a facility from the perspective of the device. Such implementations are possible because most devices that are typically installed in a facility operate at a resolution and have capabilities that are less than that of the high resolution 3D capture devices. With such implementations, it therefore becomes possible to realistically simulate the installation of a device at a given facility without actually needing to purchase the device and conduct a physical installation. The example implementations described herein thereby provide a superior solution to the related art solutions, which involve the expense and time of purchasing and conducting physical installations of the devices in order to simulate their operations of a facility. Such example implementations are superior to graphically rendered CAD models of the facility, which although can provide an artificially illustrated of the facility, is not nearly as realistic as the utilization of 3D images captured from a high resolution 3D capture device as described herein and often result in the facility manager having to test and retest device installations within the facility to determine the actual effects of the installations.

Due to the high resolution nature of such 3D capture devices, processing power is needed to render the model that may exceed the capabilities of a general purpose computer. To address such problems, example implementations utilize a cloud based solution to process the captured images and render the 3D model in the background, wherein client devices such as mobile devices, laptops, and so on, can access the 3D model via the cloud to conduct simulations of devices to be installed into a facility. With such implementations, the 3D model of the facility can be generated in the background, and can take advantage of extra computing and resources from the cloud system to reduce the time needed to render the high resolution 3D model of the facility (e.g., from a week with a general purpose computer to within a day with the cloud system). Further, when the 3D model is generated, algorithms known in the art to generate perspective views within the 3D model from a selected location can be employed and the views can be displayed to client devices in real-time without any additional rendering or excessive processing lag time.

Further, due to the high resolution nature of such models, example implementations can provide seamless conversions from 3D images to 2D for exporting into document files. Such implementations provide a perspective view in 2D of the placement of such devices in relation to the facility, which can provide a more understandable view in document files compared to exporting the 3D image directly to the document file, which the facility manager can utilize to easily understand and precisely determine the installation locations of the desired devices within the facility.

FIG. 1 illustrates an example physical configuration for the cloud system, in accordance with an example implementation. One or more client devices (e.g., laptops, mobile devices, etc.) 1, storage 2 and one or more servers 3 are connected to each other via network 4. Each client device 1 can include Central Processing Unit (CPU) 11, memory 12, storage device 13 and network port 14. Storage 2 can include CPU 21, memory 22, storage device 23 and network port 24. Server 3 can include CPU 31, memory 32, storage device 33 and network port 34. Network 4 can be implemented as any type of network according with a desired implementation, such as an Internet protocol (IP) or a Storage Area Network (SAN). CPUs 11, 21 and 31 can take the form of one or more physical hardware processors.

In example implementations, storage device 23 of storage system 2 can manage one or more 3D models and raw imagery of one or more facilities. When a client device 1 requests a 3D model of a facility to one of the servers 3, the server 3 can retrieve the corresponding 3D model of the facility from storage system 2 and load it into storage device 33 and memory 32 to present to client device 1. When raw images taken from a high resolution capture device configured to capture 3D images of a new facility are provided to storage system 2, storage system 2 can work in conjunction with one or more servers 3 to virtualize resources such as CPU 31, memory 32, CPU 21, and memory 22 to generate the 3D model of the facility from the captured images for storage into storage device 23. Once the 3D model of the facility is generated, the 3D model can be provided to a memory 32 of a server 3 so that memory 32 manages the 3D model of a facility in response to a request from device 1. Memory 32 and memory 22 can also be configured to manage management information indicating all of the devices available for simulation and their corresponding parameters, as illustrated in FIG. 7.

Figure 3:
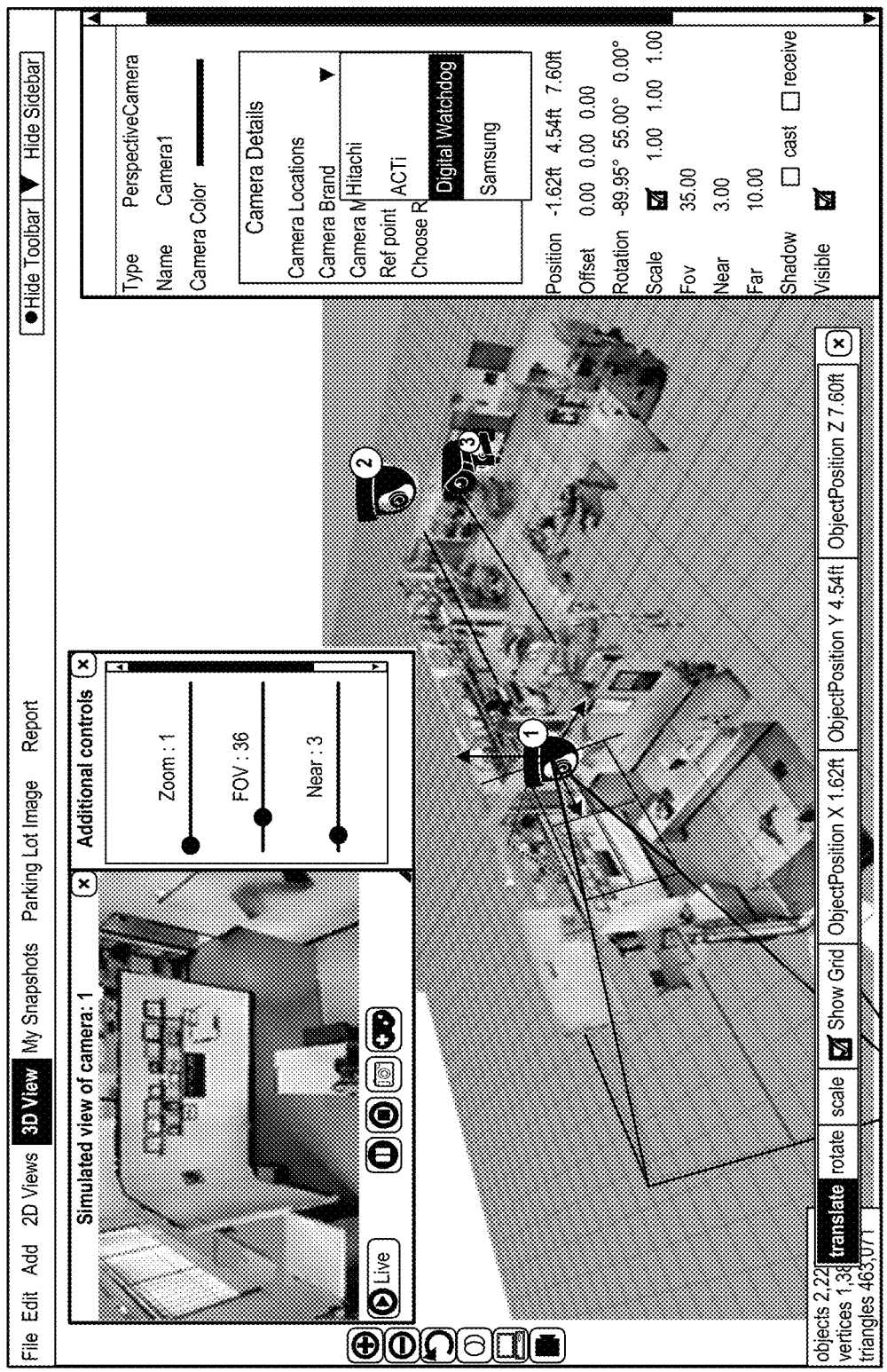
FIG. 3 illustrates an example interface with the 3D model, in accordance with an example implementation.
Figure 5:
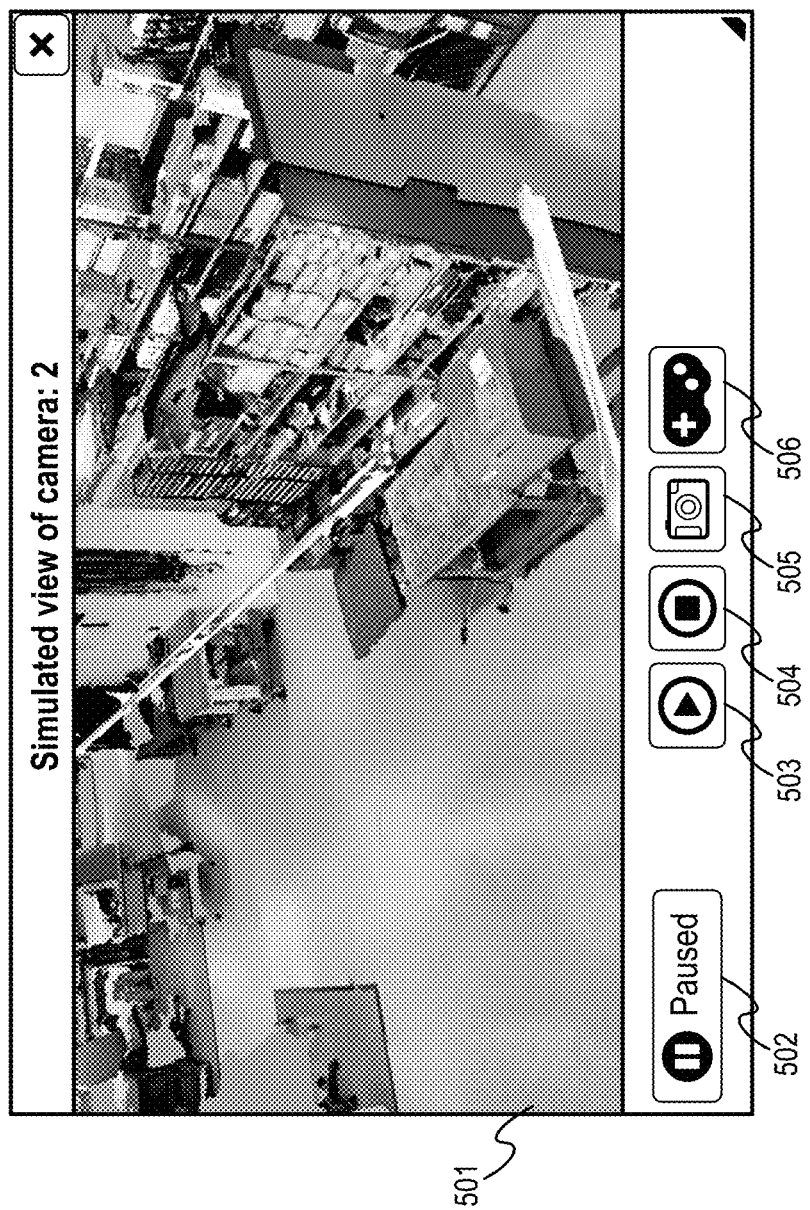
FIG. 5 illustrates an example interface providing a restricted perspective view of a device placed in the 3D model, in accordance with an example implementation.
Figure 8:
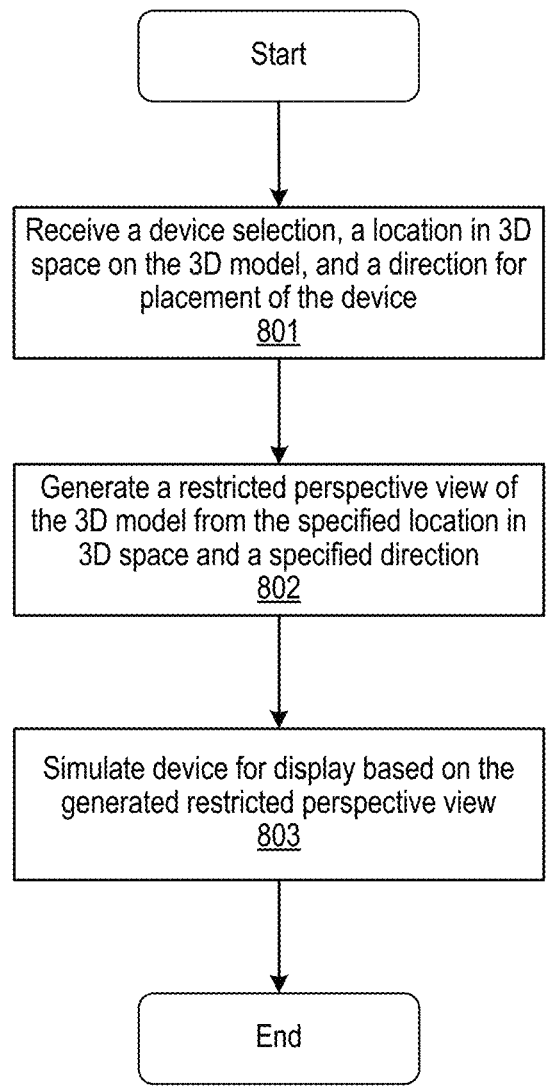
FIG. 8 illustrates an example flow diagram for processing the selection and placement of a device on the 3D model for simulation, in accordance with an example implementation.

When client device 1 is connected to one of the servers 3 that loads the 3D model from its corresponding memory 32, the corresponding processor 31 can be configured to receive, from client device 1, a location in 3D space on the 3D model for placement of a device and execute the flow diagram of FIG. 8 to place the device in the 3D model as illustrated in FIG. 3. The processor 31 can also be configured to receive a selection of a particular device from among a plurality of possible devices selected from the management information in memory 32 as illustrated in FIG. 7. The processor 31 can also be configured to receive a direction for the device to in the form of a directional vector or through any other input means in according with a desired implementation. The processor 31 can determine a restricted perspective view of the 3D model from the location in 3D space from applying parameters of the device as determined from the management information of FIG. 7, on a perspective view of the 3D model from the location in 3D space, wherein the parameters of the device are indicative of capabilities of the device (e.g., permissible field of view of the device in the form of how much a device can capture and display in a given direction, a resolution indicative of a maximum, available ranges, and available resolution capabilities, a permissible zoom to indicate zoom capabilities, permissible line of sight movement according to the parameters of the device in the form of pan and tilt capabilities of the device, rotation/movement speed of the device, etc.), and generate for display on the client device 1, the restricted perspective view of the 3D model from the location in 3D space to simulate the device as illustrated in FIGS. 3 and 5. Processor 31 can generate a restricted perspective view of the 3D model from the location in 3D space from applying parameters of the device on a perspective view of the 3D model from the location in 3D space through modifying at least one of a permissible field of view, a resolution, a permissible zoom, and permissible line of sight movement according to the parameters of the device, as the perspective view functions as a superset of all possible renderings of perspective views as simulated by a device, due to the 3D model being generated at an equal or higher resolution than the devices managed by the system.

As illustrated in management information of FIG. 7 and in the interfaces of FIG. 3, the device can selected from at least one of a plurality of types of cameras (e.g., different models of surveillance cameras, different types cameras such as infrared, video, tracking, 3D, etc.), and a plurality of types of sensors (e.g., infrared, light, different security sensor models, etc.). Other device may also be utilized and simulated in accordance with the desired implementation, such as different types of sound speakers, lights or light poles, smoke detectors, sprinklers, and any other devices that may be installed in a facility.

Figure 6:
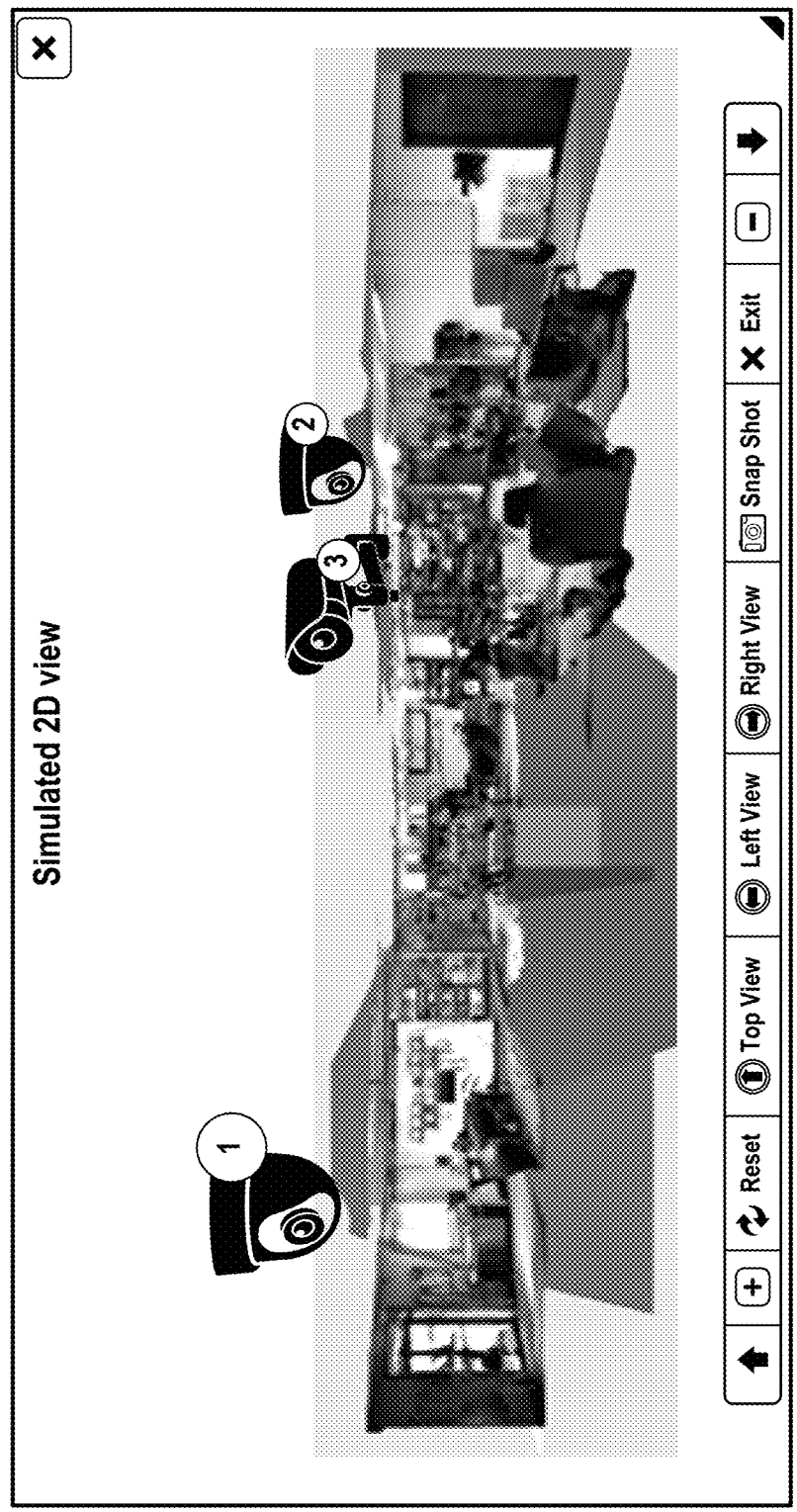
FIG. 6 illustrates an example conversion from the 3D model to a 2D view, in accordance with an example implementation.
Figure 9:
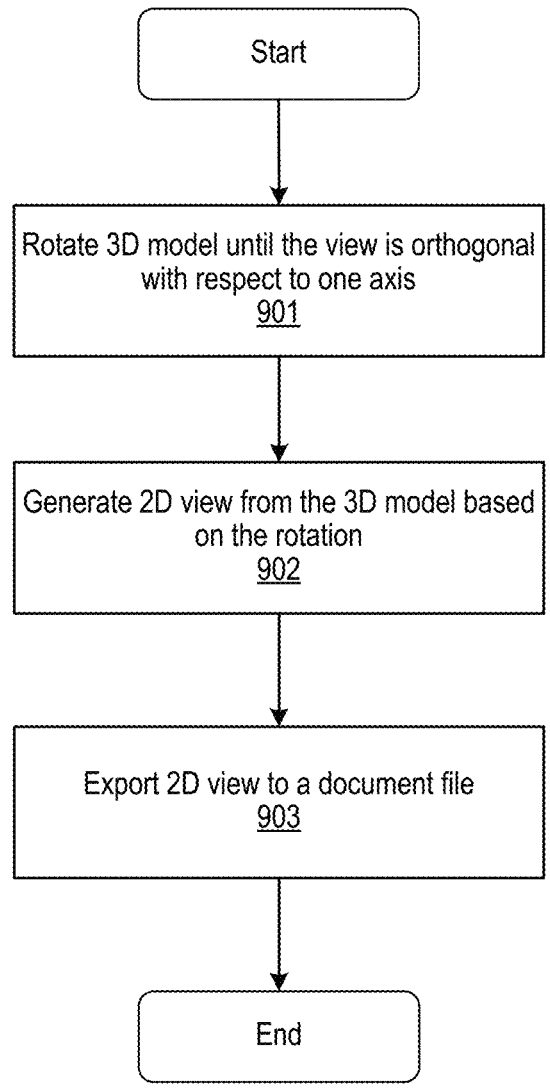
FIG. 9 illustrates an example flow for converting a 3D model view into a 2D view, in accordance with an example implementation.

In example implementations, when client device 1 submits an instruction to export the 3D model into a document file, the processor 31 can be configured to execute the flow diagram of FIG. 9 to generate another perspective view of the 3D model with an indicator of the location in 3D space based on rotating the 3D model until the 3D model is orthogonal to an axis; and export the another perspective view of the 3D model with the indicator of the location in 3D space to a document file, as illustrated in FIG. 6 to produce a 2D view of the 3D model.

Figure 10:
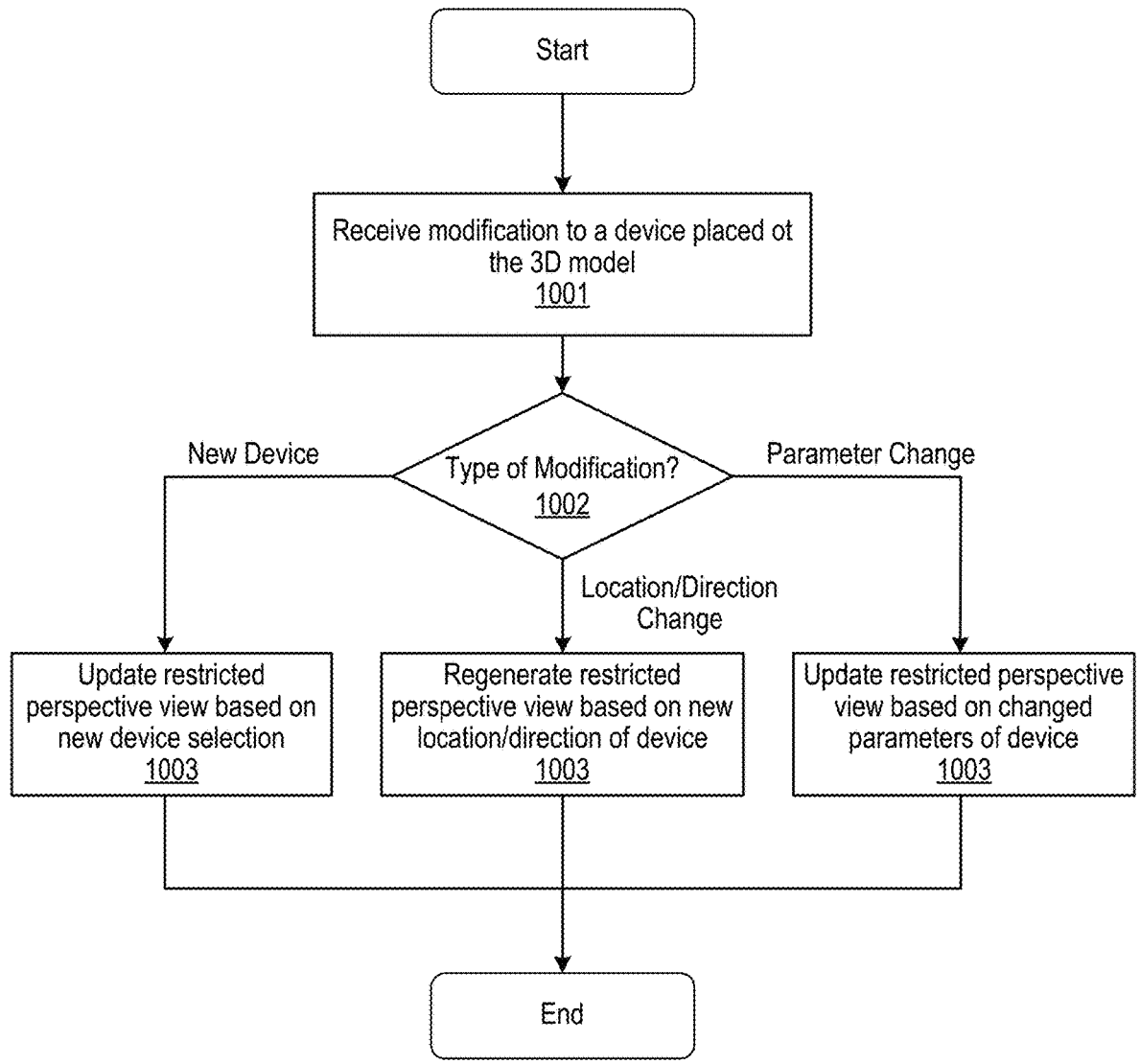
FIG. 10 illustrates an example flow diagram for processing a modification to a device placed in the 3D model, in accordance with an example implementation.

Processor 31 may also be configured to execute the flow diagram of FIG. 10 in response to receipt of a change to the location of a device being simulated in 3D space, by changing the perspective view of the 3D model from the location in 3D space and applying the parameters of the device on the changed perspective view of the 3D model from the location in 3D space to regenerate the restricted perspective view of the 3D model from the location in 3D space. As the 3D model is managed by the corresponding server 3 and perspective view generation algorithms for a model are not computationally expensive when a model is available, such views can be provided in real time in response to the instructions submitted by the client device 1.

Similarly, processor 31 can be configured to provide an interface indicating the parameters of the device as illustrated in FIG. 3, and upon receipt of a modification to one or more of the parameters on the interface by client device 1, modify the restricted perspective view based on the modification to the one or more of the parameters by executing the flow diagram of FIG. 10. Similarly, upon receipt of an instruction to the interface to change the device to another device, processor 31 can regenerate the restricted perspective view of the 3D model from the location in 3D space from applying the parameters of the another device on the perspective view of the 3D model from the location in 3D space through execution of the flow diagram of FIG. 10.

Figure 2:
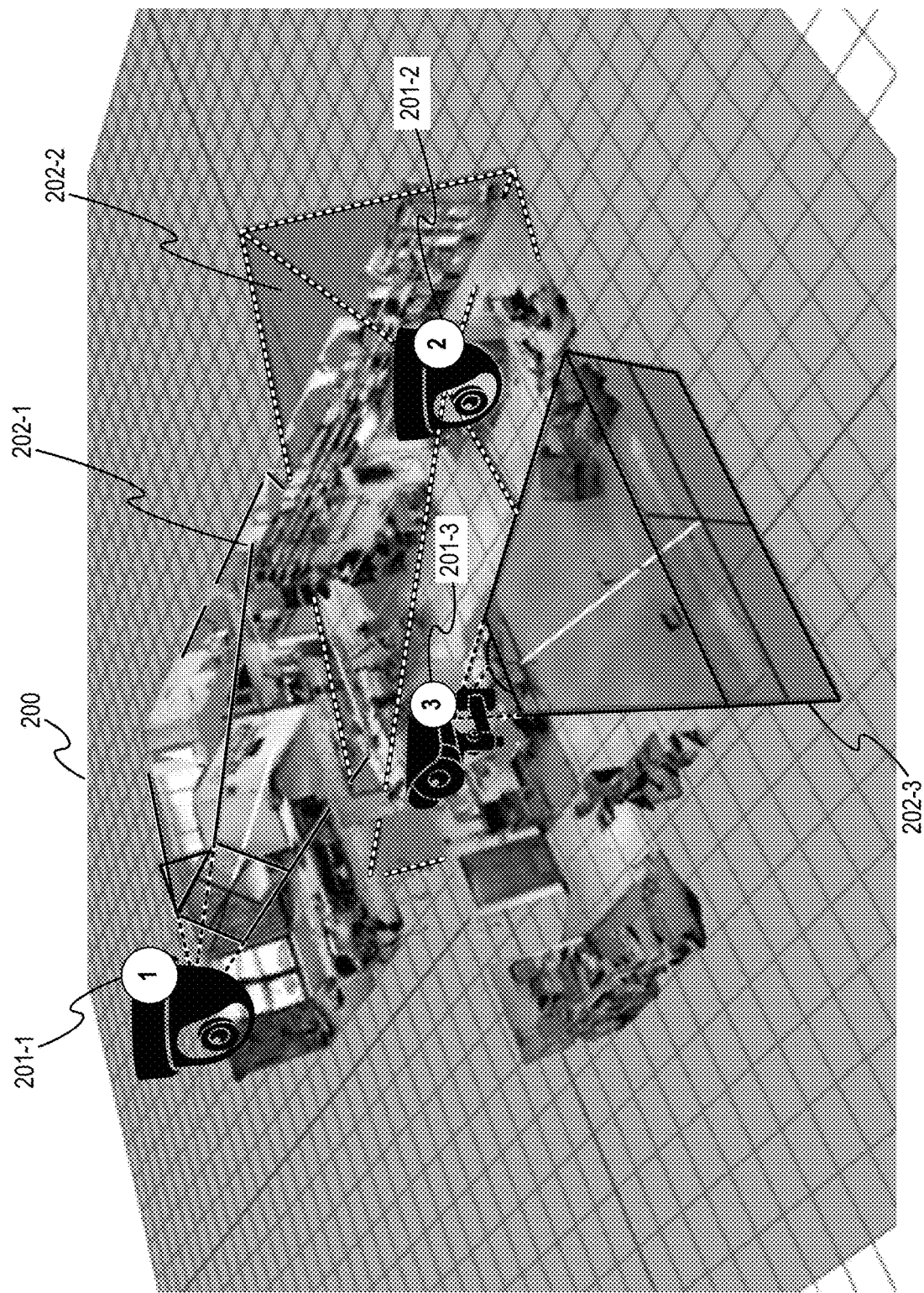
FIG. 2 illustrates an example of a 3D model using high resolution images of a facility captured by a 3D capture device, in accordance with an example implementation.

FIG. 2 illustrates an example of a 3D model using high resolution images of a facility captured by a 3D capture device, in accordance with an example implementation. In the example of FIG. 2, a 3D model 200 of the facility is rendered from the available images of a facility as captured by a high resolution 3D capture device. Such a model can be constructed through stitching of 3D images, or through any other methods for generating a 3D model from images in accordance with the desired implementation, and the present disclosure is not limited by any particular implementation. In example implementations, an interface is provided to select the type of device to be installed in the facility and the location within the 3D model. Upon selection of the type of the device and the location, the devices can be indicated on the 3D model as illustrated at 201-1, 201-2, 202-3. Depending on the desired implementation, the range of the device (e.g., field of view, sensor range, area of effectiveness, etc.) can be indicated on the 3D model as illustrate at 202-1, 202-2, 202-3, which can be determined and displayed according to any desired implementation.

FIG. 3 illustrates an example interface with the 3D model, in accordance with an example implementation. The 3D model 300 can also be associated with one or more interfaces 301, 302 in accordance with a desired implementation. In an example implementation of an interface, devices can be selected through interface 301, wherein device parameters can also be displayed in the interface. The device can be freely assigned in freespace within the 3D model 300 through drag and drop operations on a selected device, through the input of coordinates, or through any other method according to the desired implementation. Depending on the desired implementation, the direction of the device can also be selected through a drag operation, through a button click, or can be set at a default. A simulated perspective view from the device can be provided in interface 302 in response to placement of the device at a location in freespace as well as the selection of a direction for the device. The interface 302 can include controls to simulate control of the device, such as zoom, field of view, and so on in accordance with a desired implementation.

Figure 4:
FIG. 4 illustrates an example perspective view of the 3D model, in accordance with an example implementation.

FIG. 4 illustrates an example perspective view of the 3D model, in accordance with an example implementation. Specifically, FIG. 4 illustrates an example of a raw perspective view of the 3D model from the point in space and vector direction of a placed device on a 3D model. Such a perspective view can be generated by any method in accordance with the desired implementation. As the 3D model is generated from a composite of images captured from a 3D capture device, there may exist artifacts 401 that are caused by having incomplete captures of the facility, depending on the implementation utilized to render the 3D model. However, as such artifacts tend to be minor for the purposes of simulating devices, the example perspective view provides a high resolution image from which restricted perspective views can be generated for simulating devices to be installed. The resolution of the 3D capture devices used to capture the images of the facility can be in accordance with the desired implementation, and "high" resolution is utilized in the sense that the resolution captured meets or exceeds the resolution of the devices to be simulated. From such high resolution modeling, realistic simulation of device installations can thereby be performed.

FIG. 5 illustrates an example interface providing a restricted perspective view of a device placed in the 3D model, in accordance with an example implementation. Specifically, FIG. 5 illustrates an example restricted perspective view of FIG. 4, based on a selected device, and is another example implementation of interface 302 as illustrated of FIG. 3. In this example, the selected device is a surveillance camera, but other devices may also be simulated as described herein, and the present disclosure is not limited thereto. With the ability to capture high resolution 3D images through using 3D capture devices and the ability to generate 3D models from such images, an unexpected result occurs in that most of the typical devices that are installed in a facility can be realistically simulated and the simulated views are comparable to actual physical purchase and installations of such devices. The reason is that because most such devices function at lower resolution or have fewer capabilities than the raw perspective view, modifying the raw perspective view based on the parameters and capabilities of the device to generate the restricted perspective view results in a realistic simulation of the device. For example, if the device is a camera with maximum resolution of 1024x768, the resolution of the perspective view can be reduced to meet the maximum resolution of the device and the restricted perspective view generated can be the perspective view modified to that maximum resolution. In another example, if the device is a camera that can only produce black and white images, the perspective view can be changed to greyscale to simulate the camera view of the device. In another example, if the device is an infrared security sensor, the image can be modified to appear as an infrared image based on the change of color palettes.

In the example interface of FIG. 5, the restricted perspective view 501 is provided based on modification of the raw perspective view of FIG. 4 as described above. In the example of FIG. 5, the restricted perspective view 501 is formed from lowering the display resolution of the raw perspective view of FIG. 4 to simulate the telemetry of a surveillance camera having a resolution that is lower than the capture devices used to generate the 3D images. Example interface options can include an indicator to indicate if the view is paused or live 502, a play option to simulate the device 503, a stop option to stop simulation 504, a snapshot to take a snapshot of the view for incorporation in a document file 505, and a controller 506 to simulate control of the device.

In an example implementation of choosing play to simulate the device 503, the indicator 502 is switched to live, and the restricted perspective view 501 is refreshed in real time to simulate the functionality of the device. For example, if the device is a surveillance camera that periodically pans the facility at 90 degrees, the restricted perspective view 501 is constantly changed in real time to simulate the periodic panning of the device according to its parameters. If the device is a sprinkler or a type of lighting, then areas of the restricted perspective view can be dimmed at various areas to indicate where the sprinkler or lighting would not reach, and highlighted areas to indicate where the sprinkler or lighting would reach based on the parameters. Other implementations for simulating devices can also be employed depending on the type of device to be simulated.

In example implementations of controller 506, the controls can change the pan, zoom, and tilt of the perspective view, as restricted according to the parameters of the device. For example, if the device is only capable of a zoom in factor of 4×, then the controller can control the restricted perspective view 501 to zoom in up to 4× magnification. If the device has a field of view that is restricted to a particular range, then the controller can control the restricted perspective view 501 to change up to the particular range. Other implementations can also be utilized in accordance with the desired implementation.

In another example implementation, the location of the device can also be changed in conjunction with the 3D model as illustrated in FIG. 3. For example, if the restricted perspective view 501 indicates that the proposed location for the installation of a particular device is considered to be unsatisfactory, the location of the device can be repositioned through dragging and dropping the device as located on the 3D model as illustrated in FIG. 3, or through the controller 506, or through any other implementation in accordance with the desired implementation. Upon changing of the location of the device, the restricted perspective view 501 can be modified based on the positioning and angle of view from the new location, and the parameters of the device in accordance with the desired implementation.

In another example implementation, if the device is considered to be unsatisfactory based on the provided restricted perspective view 501, the device can be changed through an interface such as interface 301 or through some other methods in accordance with the desired implementation. Upon receiving a selection of another device through interface 301 or through other methods, the device is replaced by the selected device at the corresponding location in freespace of the 3D model, and the restricted perspective view 501 is regenerated based on the parameters and capabilities of the newly selected device.

FIG. 6 illustrates an example conversion from the 3D model to a 2D view, in accordance with an example implementation. In example implementations, the 3D model as illustrated in FIG. 2 can be converted into a 2D view for ease of understanding the location placement of the devices, which can be derived from right angle views of the 3D model. Such views can include top views and side views in right angle rotations.

FIG. 7 illustrates example management information for selectable devices in accordance with an example implementation. In the interfaces as illustrated in FIG. 3, a device can be selected (e.g., through interface 301), placed on the 3D model 300, and simulated (e.g., through interface 302). The parameters of the selectable devices can be managed by the management information as illustrated in FIG. 7. Examples of selectable devices can include, but are not limited to, different types of cameras (e.g., various types of surveillance cameras, infrared cameras, etc.), different types of sensors (e.g., ultrasound, security, light), or other devices such as lights, sprinklers, fire alarms, speakers, and so on according to the desired implementation. Examples of parameters can include resolution (e.g., displayable resolution options for the device, maximum resolution etc.), field of view (e.g., maximum panning range, maximum zooming range, maximum tilting range, maximum field of view for a given direction, etc.), effects to be made on the perspective view to generate the restricted perspective view (e.g., black and white or greyscale visualization, color filtering, dimming/lighting of certain areas to indicate effective areas of sprinkler/lighting/sensors, etc.), and other parameters for simulating the device (e.g., the period for panning/zooming/tilting the device, automatic object tracking, etc.) in accordance with the desired implementation. Based on the parameters of the selected device, the restricted perspective view is generated from a high resolution perspective view from the location and direction of the device.

FIG. 8 illustrates an example flow diagram for processing the selection and placement of a device on the 3D model for simulation, in accordance with an example implementation. At 801, a device selection, a location selection in 3D space on the 3D model, and a direction selection are received for placing the selected device on the 3D model as illustrated in FIG. 3. At 802, a restricted perspective view of the 3D model is generated by taking a perspective view of the 3D model along the selected direction from the selected location in 3D space, and then modifying the perspective based on the parameters of the selected device as described in FIGS. 3, 5 and 7. At 803, the selected device is simulated for display according to the generated restricted perspective view as illustrated in FIG. 5. Through the execution of the flow of FIG. 8, device installations can be realistically simulated for a facility without requiring the physical purchase and installation of such devices to confirm that the device is adequate for its purposes. Such implementations allow the facility manager to save costs resulting from a physical installation of a device, and produce a more realistic result from polygon based CAD implementations due to the use of a 3D model constructed from high resolution 3D capture devices. As the 3D model is constructed from high resolution 3D capture devices, the resolution of most typical devices installed in facilities can be encompassed, and most typical devices can thereby be realistically simulated for a given facility without necessitating a physical installation.

FIG. 9 illustrates an example flow for converting a 3D model view into a 2D view, in accordance with an example implementation. At 901, the 3D model as illustrated in FIG. 3 is rotated until the view of the 3D model is orthogonal with respect to one axis (e.g., X, Y, Z, or a desired plane in 3D space). This can be accomplished by rotating until the view produced is orthogonal with respect to one axis and/or can be selected from predefined 2D views (e.g., top, side, front, back, etc.). At 902, based on the rotation, the 2D view is generated from the 3D view rotated to be orthogonal with respect to an axis as illustrated in FIG. 6. Thus, the rotated perspective view can be provided as the 2D view for display, depending on the desired implementation. At 903, the 2D view can be exported to a document file for printing or e-mailing depending on the desired implementation. Through such an implementation, a clear 2D floorplan indicating the location of the devices with respect to the facility layout can be generated and utilized by the facility manager for physically installing such devices.

FIG. 10 illustrates an example flow diagram for processing a modification to a device placed in the 3D model, in accordance with an example implementation. At 1001, a modification to one of the devices placed on the 3D model is received. At 1002, the type of modification is determined. If the type of modification is a change of the device to another new device, the flow proceeds to 1003. If the type of modification is a change in the location or direction of the device, then the flow proceeds to 1004.

At 1003, as the device is changed to a different new device, the restricted perspective view is updated based on the parameters of the new device. At 1004, as the location or the direction is changed, the restricted perspective view is regenerated based on the repositioning or the change in direction of the device. At 1005, in response to a parameter change made to the device, the restricted perspective view is changed based on the changed parameters. The flows described above can be accomplished by re-executing the flow of FIG. 8 with the modifications.

Through the execution of the flows of FIGS. 8 and 10, the facility manager can simulate, test, change, and reposition devices to be installed in the facility without requiring the physical purchase and installation of such devices for testing. Further, as the 3D model is rendered in the cloud system, the changes and regeneration of the restricted perspective view can be conducted in real-time in response to the modifications made to the interfaces through utilizing any method known in the art to generate perspective views from a location within a 3D model. The facility manager can thereby generate a realistic simulation of devices considered for installation immediately in response to the modifications without requiring computationally expensive modelling or physical installation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   for a three dimensional (3D) model of a facility generated from images of the facility taken by a capture device configured to capture 3D images of the facility:
   receiving a location in 3D space on the 3D model for placement of a device;
   determining a restricted perspective view of the 3D model from the location in 3D space from applying parameters of the device on a perspective view of the 3D model from the location in 3D space, wherein the parameters of the device are indicative of capabilities of the device; and
   generating for display, the restricted perspective view of the 3D model from the location in 3D space to simulate the device,
   wherein upon receipt of an instruction to generate a 2D floorplan view of the 3D model:
   generating another perspective view of the 3D model with an indicator of the location in 3D space based on rotating the 3D model until the 3D model is orthogonal to an axis; and
   providing the another perspective view as the 2D floorplan view, the another perspective view indicating placement of one or more cameras or sensors on the 2D floorplan view.

2. The method of claim 1, wherein the device is selected from at least one of a plurality of types of cameras and a plurality of types of sensors.

3. The method of claim 1, wherein the generating for display, the restricted perspective view of the 3D model from the location in 3D space to simulate the device comprises providing the restricted perspective view for display to one or more client devices in real time.

4. The method of claim 1, wherein upon receipt of a change to the location in 3D space, changing the perspective view of the 3D model from the location in 3D space and applying the parameters of the device on the changed perspective view of the 3D model from the location in 3D space to regenerate the restricted perspective view of the 3D model from the location in 3D space.

5. The method of claim 1, wherein the determining the restricted perspective view of the 3D model from the location in 3D space from applying parameters of the device on a perspective view of the 3D model from the location in 3D space comprises modifying at least one of a permissible field of view, a resolution, a permissible zoom, and permissible line of sight movement according to the parameters of the device.

6. The method of claim 1, further comprising:
providing an interface indicating the parameters of the device;
upon receipt of a modification to one or more of the parameters on the interface, modifying the restricted perspective view based on the modification to the one or more of the parameters.

7. The method of claim 1, further comprising:
upon receipt of an instruction to change the device to another device, regenerating the restricted perspective view of the 3D model from the location in 3D space from applying the parameters of the another device on the perspective view of the 3D model from the location in 3D space.

8. A non-transitory computer readable medium, storing instructions for executing a process, the instructions comprising:
for a three dimensional (3D) model of a facility generated from images of the facility taken by a capture device configured to capture 3D images of the facility:
receiving a location in 3D space on the 3D model for placement of a device;
determining a restricted perspective view of the 3D model from the location in 3D space from applying parameters of the device on a perspective view of the 3D model from the location in 3D space, wherein the parameters of the device are indicative of capabilities of the device; and
generating for display, the restricted perspective view of the 3D model from the location in 3D space to simulate the device;
wherein upon receipt of an instruction to generate a 2D floorplan view of the 3D model:
generating another perspective view of the 3D model with an indicator of the location in 3D space based on rotating the 3D model until the 3D model is orthogonal to an axis; and
providing the another perspective view as the 2D floorplan view, the another perspective view indicating placement of one or more cameras or sensors on the 2D floorplan view.

9. The non-transitory computer readable medium of claim 8, wherein the device is selected from at least one of a plurality of types of cameras and a plurality of types of sensors.

10. The non-transitory computer readable medium of claim 8, wherein the generating for display, the restricted perspective view of the 3D model from the location in 3D space to simulate the device comprises providing the restricted perspective view in real time in response to submitted instructions from a client device.

11. The non-transitory computer readable medium of claim 8, the instructions further comprising:
upon receipt of a change to the location in 3D space, changing the perspective view of the 3D model from the location in 3D space and applying the parameters of the device on the changed perspective view of the 3D model from the location in 3D space to regenerate the restricted perspective view of the 3D model from the location in 3D space.

12. The non-transitory computer readable medium of claim 8, wherein the determining the restricted perspective view of the 3D model from the location in 3D space from applying parameters of the device on a perspective view of the 3D model from the location in 3D space comprises modifying at least one of a permissible field of view, a resolution, a permissible zoom, and permissible line of sight movement according to the parameters of the device.

13. The non-transitory computer readable medium of claim 8, the instructions further comprising:
providing an interface indicating the parameters of the device;
upon receipt of a modification to one or more of the parameters on the interface, modifying the restricted perspective view based on the modification to the one or more of the parameters.

14. The non-transitory computer readable medium of claim 8, the instructions further comprising:
upon receipt of an instruction to change the device to another device, regenerating the restricted perspective view of the 3D model from the location in 3D space from applying the parameters of the another device on the perspective view of the 3D model from the location in 3D space.

15. A system, comprising:
a memory, configured to manage a three dimensional (3D) model of a facility generated from images taken by a capture device configured to capture 3D images of the facility; and
a processor, configured to:
receive a location in 3D space on the 3D model for placement of a device;
determine a restricted perspective view of the 3D model from the location in 3D space from applying parameters of the device on a perspective view of the 3D model from the location in 3D space, wherein the parameters of the device are indicative of capabilities of the device; and
generate for display, the restricted perspective view of the 3D model from the location in 3D space to simulate the device;
wherein upon receipt of an instruction to generate a 2D floorplan view of the 3D model:
generate another perspective view of the 3D model with an indicator of the location in 3D space based on rotating the 3D model until the 3D model is orthogonal to an axis; and
provide the another perspective view as the 2D floorplan view, the another perspective view indicating placement of one or more cameras or sensors on the 2D floorplan view.

16. The system of claim 15, wherein the device is selected from at least one of a plurality of types of cameras and a plurality of types of sensors.

17. The system of claim 15, wherein the device is a surveillance camera configured to periodically pan according to the parameters, wherein the processor is configured to generate for display, the restricted perspective view of the 3D model from the location in 3D space to simulate the device by changing the restricted perspective view in real time to simulate the periodic pan of the surveillance camera according to the parameters.

18. The system of claim 15, wherein upon receipt of a change to the location in 3D space, the processor is configured to change the perspective view of the 3D model from the location in 3D space and apply the parameters of the device on the changed perspective view of the 3D model from the location in 3D space to regenerate the restricted perspective view of the 3D model from the location in 3D space.

19. The system of claim 15, wherein the processor is configured to determine the restricted perspective view of the 3D model from the location in 3D space from applying parameters of the device on a perspective view of the 3D model from the location in 3D space through modifying at least one of a permissible field of view, a resolution, a permissible zoom, and permissible line of sight movement according to the parameters of the device.

20. The system of claim 15, wherein the processor is configured to:
provide an interface indicating the parameters of the device;
upon receipt of a modification to one or more of the parameters on the interface, modify the restricted perspective view based on the modification to the one or more of the parameters;
upon receipt of an instruction to the interface to change the device to another device, regenerate the restricted perspective view of the 3D model from the location in 3D space from applying the parameters of the another device on the perspective view of the 3D model from the location in 3D space.

* * * * *